(12) United States Patent
Kwon et al.

(10) Patent No.: US 9,058,322 B2
(45) Date of Patent: Jun. 16, 2015

(54) APPARATUS AND METHOD FOR PROVIDING TWO-WAY AUTOMATIC INTERPRETATION AND TRANSLATION SERVICE

(71) Applicant: ELECTRONICS AND TELECOMMUNICATIONS RESEARCH INSTITUTE, Daejeon (KR)

(72) Inventors: Oh-Woog Kwon, Daejeon (KR); Ki-Young Lee, Daejeon (KR); Sung-Kwon Choi, Daejeon (KR); Yoon-Hyung Roh, Daejeon (KR); Yun Jin, Daejeon (KR); Eun-Jin Park, Daejeon (KR); Young-Kil Kim, Daejeon (KR); Sang-Kyu Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 239 days.

(21) Appl. No.: 13/863,791

(22) Filed: Apr. 16, 2013

(65) Prior Publication Data

US 2013/0297285 A1    Nov. 7, 2013

(30) Foreign Application Priority Data

May 2, 2012    (KR) .................. 10-2012-0046137

(51) Int. Cl.
G06F 17/28    (2006.01)
(52) U.S. Cl.
CPC .......... *G06F 17/289* (2013.01); *G06F 17/2863* (2013.01); *G06F 17/2872* (2013.01)

(58) Field of Classification Search
CPC ............ G06F 3/0481; G06F 17/30654; G06F 17/2863; G06F 17/2872; G06F 17/289; G06F 17/2755; G06F 17/2785; G10L 15/22; G10L 2015/228; G10L 13/043; G10L 15/265
USPC ....................... 704/2–10, 277, 260, 235, 175; 379/265.12; 715/234
See application file for complete search history.

(56) References Cited

U.S. PATENT DOCUMENTS 6,223,150 B1 *  4/2001  Duan et al. ................... 704/9
6,243,669 B1 *  6/2001  Horiguchi et al. ............ 704/9

(Continued)

FOREIGN PATENT DOCUMENTS

KR    2002-0076044    10/2002
KR    10-2009-0066067    6/2009

OTHER PUBLICATIONS

Ki-Young Lee et al., "Domain Adaptation for English-Korean MT System: from Patent Domain to IT Web News Domain ," ICCPOL, 2009.

*Primary Examiner* — Vijay B Chawan
(74) *Attorney, Agent, or Firm* — Staas & Halsey LLP

(57) ABSTRACT

The present invention relates to an apparatus and method for providing a two-way automatic interpretation and translation service. The apparatus includes a first interpretation and translation unit for interpreting and translating a first language into a second language. A second interpretation and translation unit interprets and translates the second language into the first language. A context information management unit receives conversational context and translation history information, and shares and manages the conversational context and translation history information. Each of the first and second interpretation and translation units provides an interpretation service for receiving an input conversation in the first or second language in speech and outputting results of interpretation in speech in the second or first language, and a translation service for receiving an input conversation in the first or second language in text and outputting results of translation in text in the second or first language.

12 Claims, 4 Drawing Sheets

(56) References Cited

U.S. PATENT DOCUMENTS

| | | | |
|---|---|---|---|
| 6,266,642 B1 * | 7/2001 | Franz et al. | 704/277 |
| 6,278,968 B1 * | 8/2001 | Franz et al. | 704/3 |
| 6,442,524 B1 * | 8/2002 | Ecker et al. | 704/277 |
| 7,376,556 B2 * | 5/2008 | Bennett | 704/215 |
| 2002/0198713 A1 * | 12/2002 | Franz et al. | 704/252 |
| 2009/0157380 A1 | 6/2009 | Kim et al. | |

* cited by examiner

APPARATUS AND METHOD FOR PROVIDING TWO-WAY AUTOMATIC INTERPRETATION AND TRANSLATION SERVICE

CROSS REFERENCE TO RELATED APPLICATION

This application claims the benefit of Korean Patent Application No. 10-2012-0046137, filed on May 2, 2012, which is hereby incorporated by reference in its entirety into this application.

BACKGROUND OF THE INVENTION

1. Technical Field

The present invention relates generally to an apparatus and method for providing a two-way automatic interpretation and translation service and, more particularly, to an apparatus and method for providing a two-way automatic interpretation and translation service, which improve the quality of the interpretation and translation service and allow talking users to smoothly communicate with each other by securing and sharing conversational context and translation history information.

2. Description of the Related Art

Automatic interpretation and translation device and service that are currently being released are configured such that, when a relevant native user talks with a foreigner, a device for translating a native language into a foreign language and a device for translating the foreign language into the native language are independently operated to independently translate the conversation of the foreigner into the native language and the conversation of the native user into the foreign language, thus independently translating a translation target sentence regardless of the content of the conversation of the other party.

Such a conventional automatic interpretation and translation device is problematic in that it does not utilize information about the party with whom the native user is currently talking, thus making it impossible to utilize the entire conversational context even if conversational context information is used. Therefore, there is a problem in that, the conversation of a relevant user responding to the correctly translated conversation of the other party may be incorrectly translated. For example, the conversational sentence of a Korean "난 그를 동아리 회장으로 지명할거야. (Transliteration: nan-geu-leul-dongari-hoe-jang-eu-ro-ji-myung-hal-ggeo-ya.)" is translated into "I will nominate him for club president." by Korean/English translation, so that when an American who sufficiently understands the sentence speaks the sentence "I don't nominate him for the president", the translation device translates the sentence into "나는 그를 대통령으로 임명하지 않는다. (Transliteration: na-neun-geu-leul-dae-tong-ryeong-eu-ro-im-myung-ha-ji-an-neun-da.)" Accordingly, pieces of information that have been correctly translated in the above Korean sentence, that is, "회장 (Transliteration: hoe-jang)" and "president" and "지명하 (Transliteration: ji-myung-ha)" and "nominate", are not utilized in English/Korean translation, and translation is conducted based on only the English information.

Further, there are many cases where grammatical/linguistic expressions are present only in a language, but are not present in a the other language, due to the differences with the two language.

In this case, if information previously spoken by the other party can be analyzed and utilized, important information can be found in the preceding conversation with the other party and can be very usefully utilized when it is intended to translate the current conversation. For example, in Chinese, grammatical vocabularies related to tense are not frequently used in practice, and there are many cases where it is difficult to determine whether a conversational sentence is an interrogative sentence, a declarative sentence, or an imperative sentence. However, if the tense and sentence pattern of the opponent's language is clear, the Chinese tense and sentence pattern to be translated using the information told by opponent would be distinguished more efficiently.

Further, the conventional automatic interpretation and translation device is problematic in that since it utilizes different types of translation knowledge and different technologies and techniques, there frequently occur cases where even if a first language-second language automatic interpretation and translation device or service translates content expressed in a first language into those in a second language, and a second language user views the translated content in the second language and expresses content, responding to the content, in the second language, a second language-first language automatic interpretation and translation unit cannot correctly translate the content into an expression in the original first language, thus preventing two talkers from easily understanding their conversational content.

Therefore, technology entitled "automatic interpretation apparatus and method using a conversation model" and disclosed in Korean Patent Application Publication No. 10-2002-0076044 (Oct. 9, 2002) is characterized in mat, unlike a typical automatic interpretation apparatus, a method is provided in which a mobile device presents a translated example sentence most suitable for the results of speech recognition from among translated example sentences that have been previously stored. However, such an interpretation apparatus is limited in that it is inefficient because links must be established for all interpreted sentences, and it is difficult to construct and extend link information when the size of a translated example sentence database (DB) is large.

SUMMARY OF THE INVENTION

Accordingly, the present invention has been made keeping in mind the above problems occurring in the prior art, and an object of the present invention is to provide an apparatus and method for providing a two-way automatic interpretation and translation service, which utilize tire context of conversations, analyzed and translated by interpretation and translation device, or service for two opposite language directions, and translation history information, thus naturally interpreting and translating languages when talking with the other party who uses a foreign language.

Another object of the present invention is to provide an apparatus and method for providing a two-way automatic interpretation and translation service, which share conversation history between both talking users and the results of a translation procedure, so that grammatical and semantic ambiguity, which cannot be resolved using only the context of a conversational sentence or the conversational context of one user, can be resolved, thus improving the quality of the automatic interpretation and translation service.

A further object of the present invention is to provide an apparatus and method for providing a two-way automatic interpretation and translation service, which infer grammatical and lexical expressions that are not present in a translation target language due to their linguistic differences by determining the sentence information of the preceding conversation of the other party, and which utilize the inferred expressions for interpretation and translation, thus generating naturally translated sentences.

In accordance with an aspect of the present invention to accomplish the above objects, there is provided an apparatus for providing a two-way automatic interpretation and translation service, including a first interpretation and translation unit for interpreting and translating a first language into a second language; a second interpretation and translation unit for interpreting and translating the second language into the first language; and a context information management unit for receiving conversational context and translation history information processed when translation is performed from the first and second interpretation and translation units, and sharing and managing the conversational context and translation history information, wherein each of the first and second interpretation and translation units provides an interpretation service for receiving an input conversation in the first language or the second language in a form of speech and outputting results of interpretation of the input conversation in the form of speech in the second language or the first language, and a translation service for receiving an input conversation in the first language or the second language in a form of text and outputting results of translation of the input conversation in a form of text in the second language or the first language.

Preferably, the first interpretation and translation unit may include a first speech recognition module for receiving an input conversation of a first language user in the form of speech, receiving an context of conversation and an information of translation history information from the context information management unit and converting the input conversation into text in the first language; a first morphological analysis module for receiving the first language text, receiving an context of conversation and an information of translation history information from the context information management unit and separating sentences and words from the input text, and tagging each separated word with part-of-speech tags; a first syntactic analysis module for receiving part-of-speech tags and an context of conversation, and an information of translation history information from the context information management unit, generating a first language syntactic tree with syntactic relationships between the words; a first transfer module for receiving the generated first language syntactic free and an context, of conversation and an information of translation history information from the context information management unit, converting the first language syntactic tree into a second language syntactic tree, and translating first language vocabularies corresponding to a terminal node into second language vocabularies; and a first generation module for receiving the second language vocabularies, receiving an context of conversation and an information of translation history information from the context information management unit and generating second language sentences from the second language syntactic tree and tire second language vocabularies.

Preferably, the first interpretation and translation unit may further include a first translation information output module for outputting the generated second language sentences in the form of text; and a first speech synthesis module for outputting the generated second language sentences in the form of speech.

Preferably, the second interpretation and translation unit may include a second speech recognition module for receiving an input conversation of a second language user in the form of speech, receiving an context of conversation and an information of translation history information from tire context information management unit and converting the input conversation into text in the second language; a second morphological analysis module for receiving the second language text receiving an context of conversation and an information of translation history information from the context information management unit and, separating sentences and words from the input text, and tagging each separated word with part-of-speech tags; a second syntactic analysis module for receiving part-of-speech tags and an context of conversation and an information of translation history information from the context information management unit, generating a first language syntactic tree with syntactic relationships between the words; a second transfer module for receiving the generated second language syntactic tree and an context of conversation and an information of translation history information from the context information management unit converting the second language syntactic tree into a first language syntactic tree, and translating second language vocabularies corresponding to a terminal node into first language vocabularies; and a second generation module for receiving the first language vocabularies, receiving an context of conversation and an information of translation history information from the context information management unit and generating first language sentences from the first language syntactic tree and the first language vocabularies.

Preferably, the second interpretation and translation unit may further include a second translation information output module for outputting the generated first language sentences in the form of text; and a second speech synthesis module for outputting the generated second language sentences in the form of speech.

Preferably, the context information management unit may include a first language-second language context processing module for managing conversational context and translation history information analyzed and processed by the first interpretation and translation unit; and a second language-first language context processing module for managing conversational context and translation history information analyzed and processed by the second interpretation and translation unit.

Preferably, the apparatus may further include a two-way communication unit disposed between the first and second interpretation and translation unite and the context information management unit and configured to perform mutual communication therebetween so as to collect and provide conversational context and translation history information.

Preferably, the apparatus may further include a context history management unit for storing the conversational context and the translation history information received from the two-way communication unit in a context translation information database (DB), searching the context translation information DB for information required to process context by the context information management unit, and transferring found information.

In accordance with another aspect of the present invention to accomplish the above objects, there is provided a method of providing a two-way automatic interpretation and translation service, including providing an interpretation service for receiving an input conversation in a first language or a second language in a form of speech and outputting results of interpretation of the input conversation in a form of speech in the second language or the first language, and a translation service for receiving an input conversation in the first language or the second language in a form of text and outputting results of translation of the input conversation in a form of text in the second language or the first language, using a first interpretation and translation unit or a second interpretation and translation unit; and sharing and managing, by a context information management unit receiving conversational context and translation history information processed when translation is performed from the first and second interpretation and translation units, and the conversational context and the translation history information.

Preferably, the providing the interpretation and translation service using the first interpretation and translation unit is configured to receive an input conversation of a first language user in the form of speech, receive an context of conversation and an information of translation history information from the context information management unit and converts the conversation into text in the first language, separate sentences and words from the input text, and tag each separated word with part-of-speech tags, and sets syntactic relationships between the words, and generates a first language syntactic tree indicative of results of the setting, and converts the first language syntactic tree into a second language syntactic tree, and translates first language vocabularies corresponding to a terminal node into second language vocabularies and generates second language sentences from the second language vocabularies Preferably, the providing the interpretation and translation service using the second interpretation and translation unit is configured to receive an input conversation of a second language user in the form of speech, receive an context of conversation and an information of translation history information from the context information management unit and converts the conversation into text in the first language, separate sentences and words from the input text, and tag each separated word with part-of-speech tags, and sets syntactic relationships between the words, and generates a second language syntactic tree indicative of results of the setting, and converts the second language syntactic tree into a first language syntactic tree, and translates second language vocabularies corresponding to a terminal node into first language vocabularies and generates first language sentences from the first language vocabularies.

Preferably, the context information management unit sharing and managing the conversational context and the translation history information analyzed and processed by the first and second interpretation and translation units is configured to searches the context translation information DB for information required to process context by the first and second interpretation and translation units, and transfers the found information.

BRIEF DESCRIPTION OF THE DRAWINGS

The above and other objects, features and advantages of the present invention will be more clearly understood from the following detailed description taken in conjunction with tire accompanying drawings, in which.

DESCRIPTION OF THE PREFERRED EMBODIMENTS

Figure 1:
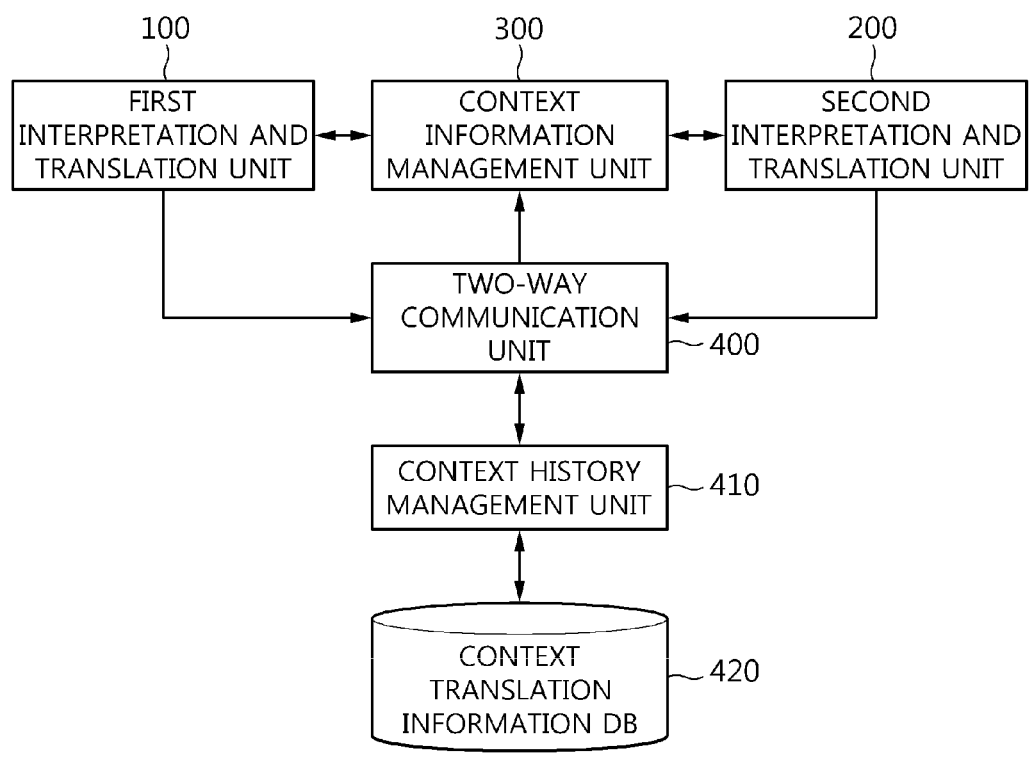
FIG. 1 is a block diagram showing the configuration of an apparatus for providing a two-way automatic interpretation and translation service according to an embodiment of tire present invention.

Preferred embodiments of the present invention will be described in detail below with reference to the accompanying drawings to such an extent that those skilled in the art can easily implement the technical spirit of the present invention. Reference now should be made to the drawings, in which the same reference numerals are used throughout the different drawings to designate the same or similar components. In the following description, redundant descriptions and detailed descriptions of known elements or functions that may unnecessarily make the gist of the present invention obscure will be omitted.

Figure 2:
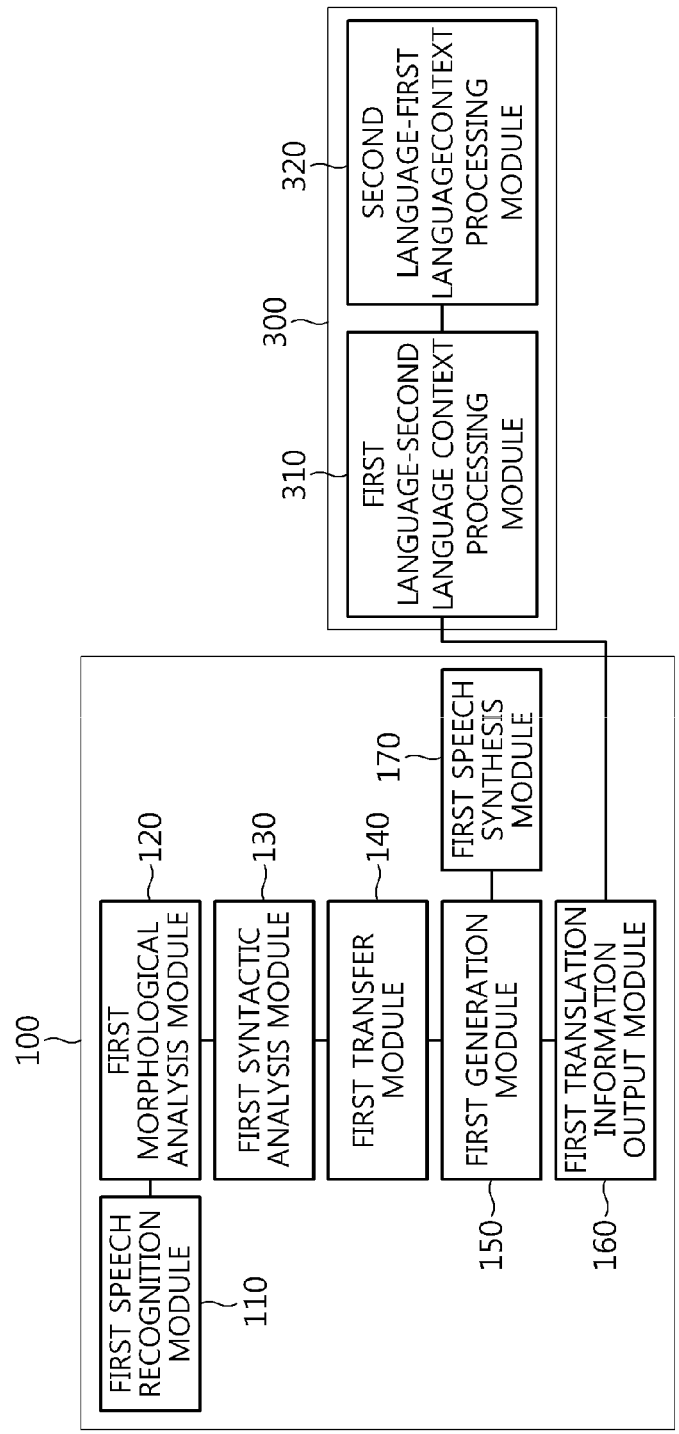
FIG. 2 is a block diagram showing the detailed configuration of a first interpretation and translation unit employed in the apparatus for providing a two-way automatic interpretation and translation service according to an embodiment of tire present invention.
Figure 3:
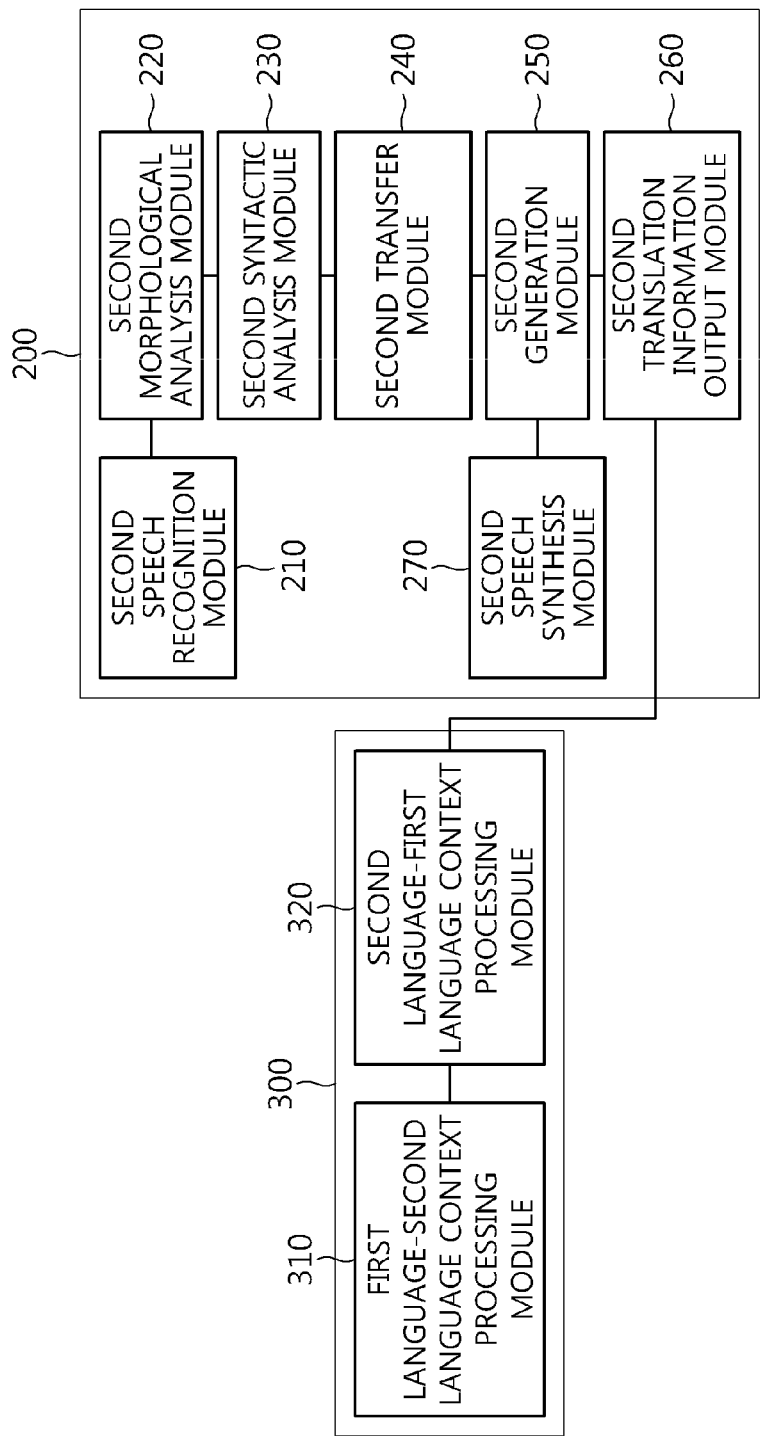
FIG. 3 is a block diagram showing the detailed configuration of a second interpretation and translation unit employed in the apparatus for providing a two-way automatic interpretation and translation service according to an embodiment of the present invention.

Hereinafter, an apparatus for providing a two-way automatic interpretation and translation service according to an embodiment of the present invention will be described in detail with reference to the attached drawings. FIG. 1 is a block diagram showing the configuration of an apparatus for providing a two-way automatic interpretation and translation service according to an embodiment of the present invention, FIG. 2 is a block diagram showing the detailed configuration of a first interpretation and translation unit employed in the apparatus for providing a two-way automatic interpretation and translation service according to an embodiment of the present invention, and FIG. 3 is a block diagram showing the detailed configuration of a second interpretation and translation unit employed in the apparatus for providing a two-way automatic interpretation and translation service according to an embodiment of the present invention.

As shown in FIG. 1, an apparatus for providing a two-way automatic interpretation and translation service according to the present invention includes a first interpretation and translation unit 100, a second interpretation and translation unit 200, a context information management unit 300, a two-way communication unit 400, a context history management unit 410, and a context translation information database (DB) 420.

In this case, the first interpretation and translation unit 100 and the second interpretation and translation unit 200 are different only in a source language and a target language, and they have the same configurations and functions. Accordingly, in the present invention, redundant descriptions of the same parts that can be made for the first and second interpretation and translation units 100 and 200 will be omitted here.

The first interpretation and translation unit 100 interprets and translates a first language into a second language. The first interpretation and translation unit 100 provides an interpretation service for receiving an input conversation in the first language in the form of speech and outputting the results of interpretation of the conversation in fee form of speech in the second language, and a translation service for receiving an input conversation in the first language in the form of text and outputting the results of translation of the conversation in the form of text in fee second language.

For this, as shown in FIG. 2, the first interpretation and translation unit 100 includes a first speech recognition module 110, a first morphological analysis module 120, a first syntactic analysis module 130, a first transfer module 140, a first generation module 150, a first translation information output module 160, and a first speech synthesis module 170.

The first speech recognition module 110 receives the input conversation of a first language user in the form of speech, and converts the conversation into text in the first language. In this case, when the first speech recognition module 110 converts the utterance of the user into text, ambiguity in speech recognition occurs, so that n various text candidates can be generated for the same utterance of the user. The first speech recognition module 110 selects optimal text candidate from among the n text candidates depending on speech recognition weights and language model weights, and outputs the selected optimal text candidate. The first speech recognition module 110 may be used to select optimal text from among the n text candidates by utilizing the information of the context translation information DB 420 that stores the context of the preceding conversation of the other party (user) and the translation history information of the conversation, and thus the performance of the first speech recognition module 110 can be improved. In this case, the first speech recognition module 110 can receive information, required to process ambiguity in speech recognition using the first language-second language context processing module 310 of the context information management unit 300, from the two-way communication unit 400, and can utilize the context translation information DB 420 that stores the preceding conversational context and translation history information.

For example, it is assumed that, in the preceding conversation of the other party, intermediate results obtained by interpreting and translating the Korean sentence "난 그를 농아리 회장으로 지명할거야. (Transliteration: nan-geu-leul-dongari-hoe-jang-eu-ro-ji-myung-hal-ggeo-ya.)" into "I will nominate him for club president." and the translation information of the sentence are stored in die context translation information DB 420. In this case, if, for speech "I don't nominate him for the president." uttered by a current English user, candidates for speech recognition results, such as (1) "I don't nominate him for the president.", (2) "I don't nominate him for the present.", and (3) "1 don't navigate him for the president" are selected, it can be seen that, compared to "navigate" and "present" that exist in the results recognized as candidates (2) and (3), "nominate" and "president" in candidate (1) are more accurate recognition results because content previously uttered by the other party with regard to themes "nominate" and "president" is stored in the context translation information DB 420. Further, in addition to information obtained by translating the conversation of the other party, content uttered by the corresponding user and translated information of the content are also stored in and managed by the context translation information DB 420, so that an inaccurately recognized word is replaced with another word to conduct a conversation or, alternatively, the corresponding word is accurately re-uttered. Accordingly, information about the frequencies of accurately recognized core words of each conversation in the context translation information DB 420 increases and the weights of the core words increase, whereas weights of inaccurately recognized words decrease due to the frequency information of the words, thus further improving the accuracy of speech recognition.

The first morphological analysis module 120 receives text recognized by the first speech recognition module 110 or text personally entered by the user, separates sentences and words from the text, and tags each separated words with information about the exact morphemic parts of speech. That is, the first morphological analysis module 120 has the probability of separating the input text into various words and the probability of tagging each word with the exact morphemic parts of speech. Generally, ambiguity in morphological analysis is processed using information contained in a given conversational sentence. Therefore, the first morphological analysis module 120 can more accurately resolve the ambiguity of information stored in the context translation information DB 420 by utilizing the first language-second language context processing module 310.

For example, when, for an existing conversational sentence "I had a cold yesterday.", information indicative of "cold- 감기 (Transliteration: gam-gi) noun" together with the Korean translation "나는 어제 감기가 걸렸어. (Transliteration: na-nuen-eo-je-gam-gi-ga-geol-ryoe-eo.)" are stored in the context translation information DB 420, if the other party speaks the Korean sentence "요즘 감기는 오렌 지가 매우 좋아. (Transliteration: yo-jeum-gam-gi-neun-orange-ga-mae-u-jo-a.)", morphemes of the Korean " 감기는 (Transliteration: gam-gi-neun)" can be analyzed into " 감기 (Transliteration: gam-gi)/noun+ 는 (Transliteration: nuen)/auxiliary particle", " 감기 (Transliteration: gam-gi)/verb+ 는 (Transliteration: nuen)/adnominal ending", and " 는 (Transliteration: gam)/verb+ 기 (Transliteration: gi)/nominal transforming final ending+ 는/auxiliary particle". The first morphological analysis module 120 receives information " 감기 (Transliteration: gam-gi)/noun" and the frequency thereof, stored in the context translation information DB 420, through the first language-second language context processing module 310, and analyzes the morphemes of the received information into " 감기 (Transliteration: gam-gi)/noun+ 는 (Transliteration: nuen)/auxiliary particle" including " 감기 (Transliteration: gam-gi)/noun." As seen in the example, languages, such as Chinese, Japanese, and Korean, which have great ambiguity in the separation of morphemes, make it possible to accurately separate words if information translated from the opposite language, such as English, German, and French, which has no ambiguity in the separation of morphemes, is utilized. In particular, in the case of a language, such as Chinese which has no word boundaries and is composed of ideographic characters, and which enables words to be separated in various manners, it is possible to more exactly separate words if the results of analysis of the opposite language and the translation information thereof are utilized. Further, each word has various morphemic parts of speech and, in order to resolve ambiguity in the morphemic parts of speech of words, each word can be tagged with the more frequent morphemic parts of speech if relationships between the words stored in the context translation information DB 420 and the morphemic parts of speech of the words are utilized.

The first syntactic analysis module 130 receives the results of separation of words and tagging of the words with the morphemic parts of speech from the first morphological analysis module 120, sets syntactic relationships between the words, and generates a syntactic tree indicative of the results of the setting. Even in the first syntactic analysis module 130, there are syntactic, relationships having ambiguity, and such ambiguity can be resolved in such a way as to receive information stored in the context translation information DB 420 through the first language-second language context processing module 310 and to more definitely process the chunking of noun/number.

For example, if, in a preceding conversation, the Korean sentence "선거일이 언제죠? (Transliteration; seon-geo-il-i-eon-jae-ji-yo?)" is translated into "When is the day of the election?", and bilingual word-related information is stored as " 선거일 (Transliteration: seon-geo-il) the day of the election" in the context translation information DB 420, it can be seen that " 선거일 (Transliteration: seon-geo-il)" is chunked into the noun phrase "the day of the election" when the sentence "1 December has been nominated as the day of the election, for the club president." is translated. Accordingly, chunking can be performed prior to the analysis of syntax, and then the performance of syntactic analysis can be improved. Further, with regard to the problem of ambiguity in the prepositional phrase occurring in a language such as English, Korean sentences, the translated English sentences thereof, and intermediate results of the translation may be useful for resolving expressions whose prepositional phrases are ambiguous as they occur in the flow of a conversation.

The first transfer module 140 receives a first language syntactic tree indicative of the results of the first syntactic analysis module 130, converts the first language syntactic tree into a second language syntactic tree through a first language-second language syntax conversion rule/pattern DB, and translates first language vocabularies corresponding to the terminal node of the syntactic tree into second language vocabularies using a first language-second language bilingual dictionary. The first transfer module 140 receives first language-second language bilingual word information, obtained by automatically interpreting and translating words in two-way conversations stored in the context translation information DB 420, through the first language-second language context processing module 310 when translating bilingual words, in the form of information suitable for the processing of ambiguity in bilingual words, and uses the first language-second language bilingual word information to translate first language vocabularies into second language vocabularies, thus improving the performance of translation.

For example, the sentence "난 그를 동아리 회장 으로 지명할거야. (Transliteration: nan-geu-leul-dorigari-hoe-jang-eu-ro-ji-myung-hal-ggeo-ya.)" is translated into "I will nominate him for club president." by automatic interpretation and translation. In this case, by means of information stored as "nominate/지명하 (Transliteration: ji-myung-ha)/verb" and "president/회장 (Transliteration: hoe-jang)/noun" in the context translation information DB, "지명하 (Transliteration: ji-myung-ha)" is selected from among bilingual words "임명하 (Transliteration: im-myung-ha)" and "지명하 (Transliteration: ji-myung-ha)/" related to "nominate/verb" in the currently input English sentence "I don't nominate him for the president." Further, "회장 (Transliteration: hoe-jang)" rather than "대통령 (Transliteration: dae-tong-ryeong)" that is frequently translated is selected from among bilingual words "대통령 (Transliteration: dae-tong-ryeong)" and "회장 (Transliteration: hoe-jang)" related to "president/noun." Furthermore, when the first language talker repeatedly utters expressions appearing in sentences in which the second language has been translated into the first language in preceding conversations, second language-first language conversion patterns stored in the context translation information DB 420 are converted into first language-second language conversion patterns, and then the first language-second language conversion patterns are used for translation. Accordingly, first language conversations are translated into second language conversations, thus allowing the second language talker to easily understand the conversations.

The first generation module 150 receives the second language syntactic tree and second language vocabularies, which are indicative of the results of the first transfer module 140, as input, generates the sequence of words and functional vocabularies required to generate second language sentences, such as the ending/postposition of Korean, and then generates second language sentences.

The first generation module 150 receives context history information required for generation from the context translation information DB 420 through the first language-second language context processing module 310, and infers and generates information about the tense of a predicative and a sentence pattern that are not included in the first language from tense and a sentence pattern included in the immediately preceding conversation of the other party.

For example, since explicit vocabularies are not used in Chinese, it is difficult to determine tense and a sentence pattern unless meanings and context are exactly grasped. However, in languages such as Korean and English, the tense of a predicative and a sentence pattern are clearly expressed. If a first language is Chinese, and a second language is Korean, a sentence pattern and tense omitted when a translated Korean sentence is generated for a Chinese sentence can be obtained as a sentence pattern and tense having the highest probability depending on the sentence patterns and the tease of preceding Korean sentences, by utilizing the results of learning variations in sentence patterns and tense between Korean conversations corresponding to the second language.

The first translation information output module 160 outputs second language sentences, generated and translated by the first generation module 150, in the form of text. Further, the first translation information output module 160 transmits to the two-way communication unit 400 speech-recognized text indicating the results of the first speech recognition module 110, information about separated sentences/words and the morphemic parts of speech thereof indicating the results of the first morphological analysis module 120, the results of chunking noun phrases, information about the first language syntactic tree and grammatical information, such as the sentence pattern and tense of the first language, indicating the results of the first syntactic analysis module 130, first language-second language conversion pattern information and first language-second language bilingual word information used to generate the results of the first transfer module 140, and second language translation sentences generated by the first generation module 150. As a result translation knowledge information and results utilized in the interpretation and translation procedure are stored in the context translation information DB 420 in the sequence of conversational history.

The first speech synthesis module 170 outputs the second language sentences, generated and translated by the first generation module 150, in the form of speech.

The second interpretation and translation unit 200 interprets and translates a second language into a first language. The second interpretation and translation unit 200 provides an interpretation service for receiving an input conversation in tire second language in the form of speech and outputting the results of interpretation of the conversation in the form of speech in the first language, and a translation service for receiving an input conversation in the second language in tire form of text and outputting the results of translation of the conversation in the form of text in the first language.

For this, as shown in FIG. 3, fee second interpretation and translation unit 200 includes a second speech recognition module 210, a second morphological analysis module 220, a second syntactic analysis module 230, a second transfer module 240, a second generation module 250, a second translation information output module 260, and a second speech synthesis module 270.

The second speech recognition module 210 receives the input conversation of a second language user in the form of speech and converts the conversation into text in the second language. In this case, the second speech recognition module 210 can receive information, required to process ambiguity in speech recognition using the second language-first language context processing module 320 of the context information management unit 300, from the two-way communication unit 400, and can utilize the context translation information DB 420 that stores the context of preceding conversations and translation history information.

The second morphological analysis module 220 receives text recognized by the second speech recognition module 210 or text personally entered by the user, separates sentences and words from the text, and tags each separated words with information about the exact morphemic parts of speech. That is, the second morphological analysis module 220 has the probability of separating the input text into various words and the probability of tagging each word with the exact morphemic parts of speech. Generally, ambiguity in speech recognition is processed using information contained in a given conversational sentence. Therefore, the second morphological analysis module 220 can more accurately resolve the ambiguity of information stored in the context translation information DB 420 by utilizing the second language-first language context processing module 320.

The second syntactic analysis module 230 receives the results of separation of words and tagging of tire words with the morphemic parts of speech from the second morphological analysis module 220, sets syntactic relationships between the words, and generates a syntactic tree indicative of the results of the setting. Even in the second syntactic analysis module 230, there are syntactic relationships having ambiguity, and such ambiguity can be resolved in such a way as to receive information stored in the context translation information DB 420 through the second language-first language context processing module 320 and to more definitely process the chunking of noun/number.

The second transfer module 240 receives a second language syntactic tree indicative of the results of the second syntactic analysis module 230, converts the second language syntactic tree into a first language syntactic tree through a second language-first language syntax conversion rule/pattern DB, and translates second language vocabularies corresponding to the terminal node of the syntactic tree into first language vocabularies using a second language-first language bilingual dictionary. The second transfer module 240 receives second language-first language bilingual word information, obtained by automatically interpreting and translating words in two-way conversations stored in tire context translation information DB 420, through the second language-first language, context processing module 320 when translating bilingual words, in the form of information suitable for the processing of ambiguity in bilingual words, and uses the second language-first language bilingual word information to translate second language vocabularies into first language vocabularies, thus improving the performance of translation.

The second generation module 250 receives the first language syntactic tree and first language vocabularies, which are indicative of the results of the second transfer module 240, as input generates the sequence of words and functional vocabularies required to generate first language sentences, such as the ending/postposition of Korean, and then generates first language sentences.

The second generation module 250 receives context history information required for generation from the context translation information DB 420 through the second language-first language context processing module 320, and infers and generates information about the tense of a predicative and a sentence pattern that are not included in the second language from tense and a sentence pattern included in the immediately preceding conversation of the other party.

The second translation information output module 260 outputs first language sentences, generated and translated by the second generation module 250, in the form of text. Further, the second translation information output module 260 transmits to the two-way communication unit 400 speech-recognized text indicating the results of the second speech recognition module 210, information about separated sentences/words and the morphemic parts of speech thereof indicating the results of the second morphological analysis module 220, the results of chunking noun phrases, information about the second language syntactic tree and grammatical information, such as the sentence pattern, and tense of the second language, indicating the results of the second syntactic analysis module 230, second language-first language conversion pattern information and second language-first language bilingual word information used to generate the results of the second transfer module 240, and first language translation sentences generated by the second generation module 250. As a result, translation knowledge information and results utilized in the interpretation, and translation procedure are stored in the context translation information DB 420 in the sequence of conversational history.

The second speech synthesis module 270 outputs the first language sentences, generated and translated by die second generation module 250, in the form of speech.

The context information management unit 300 shares and manages conversational context and translation history information analyzed and processed by the first and second interpretation and translation units 100 and 200. As described above, the context information management unit 300 resolves semantic and grammatical ambiguity, based on two-way conversation history required by the first and second speech recognition modules 110 and 210, the first and second morphological analysis modules 120 and 220, the first and second syntactic analysis modules 130 and 230, the first and second transfer modules 140 and 240, and the first and second generation modules 150 and 250 so that they match individual language translation pairs by using the context translation information DB 420 that stores the conversational context and translation history information.

For this, the context information management unit 300 includes the first language-second language context processing module 310 for managing conversational context and translation history information analyzed and processed by the first interpretation and translation unit 100 and the second language-first language context processing module 320 for managing conversational context and translation history information analyzed and processed by the second interpretation and translation unit 200. Accordingly, the context information management unit 300 utilizes the information stored in the context translation information DB 420 so that they are suitable for language pairs and the directionality thereof throughout the entire processing procedure, thus resolving ambiguity and vagueness that cannot be resolved using only information contained in sentences in each processing procedure.

The two-way communication unit 400 collects and provides conversational context and translation history information by performing mutual communication between the first and second interpretation and translation units 100 and 200 and the context information management unit 300. When the two independent first and second interpretation and translation units 100 and 200 are operated on different terminal devices, the two-way communication unit 400 is present on a server so that the context translation information DB 420 is stored on the server, and is then capable of communicating with the two terminal devices. Alternatively, the two-way communication unit 400 may be present in each of the terminal devices, and the terminal devices communicate with each other. The context translation information DB 420 is equally present in each of the two terminal devices, so that the two-way communication units may respectively support interpretation and translation when the automatic interpretation and translation units provided in the respective terminal devices perform interpretation and translation. Alternatively, the two-way communication unit 400 may be operated on the server together with the first and second interpretation and translation units 100 and 200, and may provide the results of the interpretation and translation to users via clients.

The context history management unit 410 receives input sentences, translated sentences, results obtained in the interpretation and translation procedure, and translated information used in the procedure, which are provided by the first and second translation information output modules 160 and 260, through the two-way communication unit 400, and stores the received information in the context translation information DB 420 depending on the history thereof. Further, the context history management unit 410 searches the context translation information DB 420 for information required to process context by the first language-second language context processing module 310 and the second language-first language context processing module 320, and transfers the found information through the two-way communication unit 400.

The context translation information DB 420 stores therein pieces of information provided by the first and second translation information output modules 160 and 260, that is, the input sentences, the translated sentences, the results of the interpretation and translation procedure, and the conversational context and translation history information used in the procedure.

Figure 4:
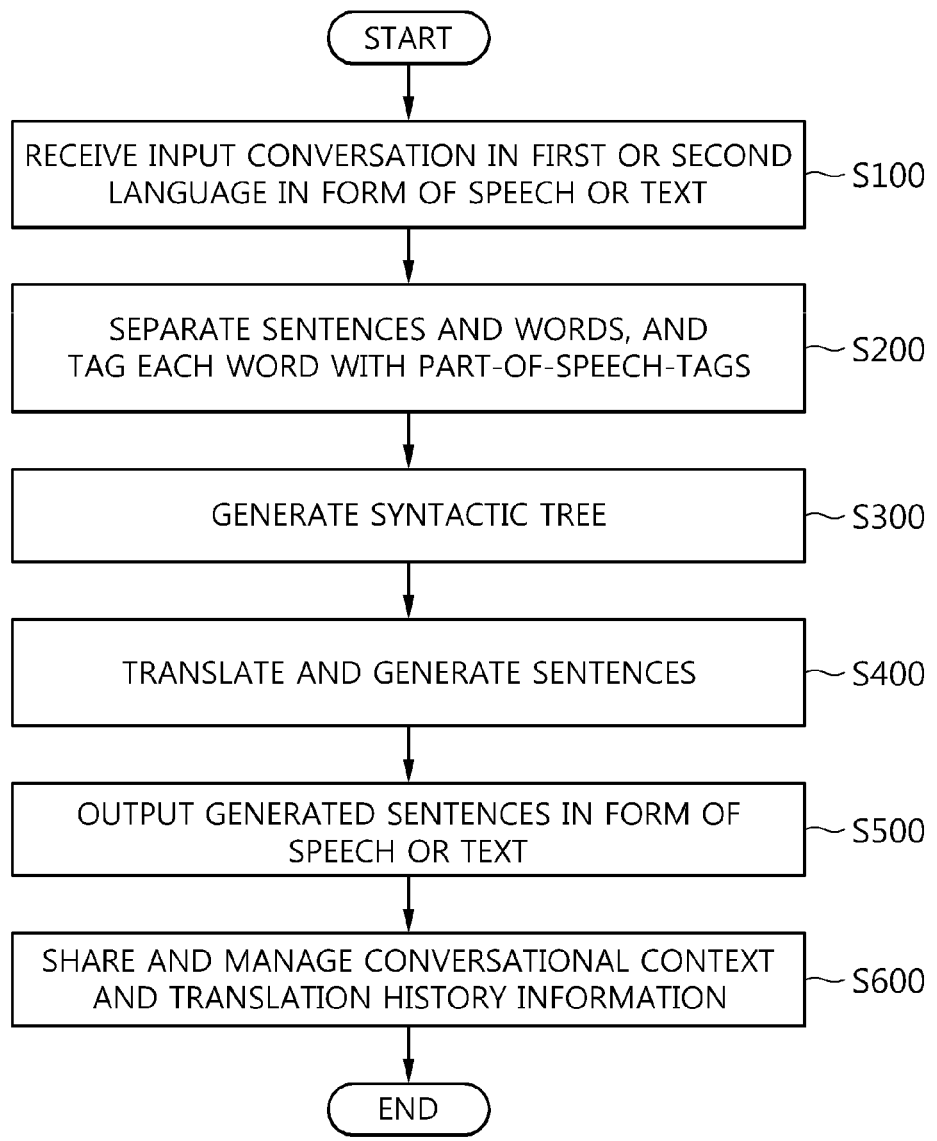
FIG. 4 is a flowchart showing the flow of a method of providing a two-way automatic interpretation and translation service according to an embodiment of the present invention.

Hereinafter, a method of providing a two-way automatic interpretation and translation service according to an embodiment of the present invention will be described in detail with reference to the attached drawings. FIG. 4 is a flowchart showing the flow of the method of providing a two-way automatic interpretation and translation service according to an embodiment of the present invention.

As shown in FIG. 4, the method of providing a two-way automatic interpretation and translation service according to the present invention provides an interpretation service for receiving an input conversation in a first or second language in the form of speech through the first and second interpretation and translation units 100 and 200, and outputting the results of interpretation of the input conversation in the form of speech in the second or first language, and a translation service for receiving an input conversation in tire first language or second language in the form of text and providing the results of translation of the input conversation in the form of text in the second or first language.

For this, the first and second interpretation and translation units receive the first or second language input conversation in the form of speech or text at step S100.

Then, sentences and words are separated from the input text, and each separated word is tagged with information about the morphemic parts of speech at step S200.

Next, part-of-speech is input to set syntactic relationships between the words, and a first or second language syntactic tree indicative of the results of the setting is generated at step S300.

Next, the first or second language syntactic tree is converted into a second or first language syntactic tree, first language vocabularies corresponding to a terminal node are translated into second language vocabularies, and the second language vocabularies are translated into first language vocabularies, and thus sentences are generated at step S400.

Thereafter, the generated second language sentences or the first language sentences are output in the form of speech or text at step S500.

Finally, the context information management unit 300 shares and manages conversational context and translation history information analyzed and processed by the first and second interpretation and translation units 100 and 200 at step S600. This step is based on the fact that the conversational context and translation history information are collected and provided between the first and second interpretation and translation units 100 and 200 and the context information management unit 300 through the two-way communication unit 400 that performs two-way communication.

In this way, the present invention can naturally interpret and translate conversations with the other party who uses a foreign language by utilizing foe context of conversations and translation history information analyzed and translated by the interpretation and translation units for two types of opposite language directions, thus enabling the intent of the other party to be easily determined and inferred. Therefore, the quality of the automatic interpretation and translation service can be improved.

As described above, the present invention having the above configuration is advantageous in that it utilizes the context of conversations, analyzed and translated by interpretation and translation units for two opposite language directions, and translation history information, so that languages can be naturally interpreted and translated when talking with the other party who uses a foreign language, thus allowing a talking user to more easily determine the intent of the other parry.

Further, the present invention is advantageous in that it shares conversation history between both talking users and the results of a translation procedure, so that grammatical and semantic ambiguity, which cannot be resolved using only the context of a conversational sentence or the conversational context of one user, can be resolved, thus improving the quality of the automatic interpretation and translation service.

Further, the present invention is advantageous in that it infers grammatical and lexical expressions that are not present in a translation target language due to their linguistic differences by determining the sentence information of the preceding conversation of the other party, and it utilizes the inferred expressions for interpretation and translation, thus generating naturally translated sentences.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for providing a two-way automatic interpretation and translation service, comprising:
   a first interpretation and translation unit for interpreting and translating a first language into a second language;
   a second interpretation and translation unit for interpreting and translating the second language into the first language; and
   a context information management unit for receiving conversational context and translation history information processed when translation is performed from the first and second interpretation and translation units, and sharing and managing the conversational context and translation history information,
   wherein each of the first and second interpretation and translation units provides an interpretation service for receiving an input conversation in the first language or the second language in a form of speech and outputting results of interpretation of the input conversation in the form of speech in the second language or the first language, and a translation service for receiving an input conversation in the first language or the second language in a form of text and outputting results of translation of the input conversation in a form of text in the second language or the first language.

2. The apparatus of claim 1, wherein the first interpretation and translation unit comprises:
a first speech recognition module for receiving an input conversation of a first language user in the form of speech, receiving an context of conversation and an information of translation history information from the context information management unit and converting the input conversation into text in the first language; a first morphological analysis module for receiving the first language text, receiving an context of conversation and an information of translation history information from the context information management unit, separating sentences and words from the input text and tagging each separated word with part-of-speech tags;
a first syntactic analysis module for receiving part-of-speech tags and an context of conversation and an information of translation history information from the context information management unit, setting syntactic relationships between the words, and generating a first language syntactic tree indicative of results of the setting;
a first transfer module for receiving the generated first language syntactic tree and an context of conversation and an information of translation history information from the context information management unit, converting the first language syntactic tree into a second language syntactic tree, and translating first language vocabularies corresponding to a terminal node into second language vocabularies; and
a first generation module for receiving the second language vocabularies, receiving an context of conversation and an information of translation history information from the context information management unit and generating second language sentences from the second language vocabularies.

3. The apparatus of claim 2, wherein the first interpretation and translation unit further comprises:
a first translation information output module for outputting the generated second language sentences in the form of text; and
a first speech synthesis module for outputting the generated second language sentences in the form of speech.

4. The apparatus of claim 1, wherein the second interpretation and translation unit comprises:
a second speech recognition module for receiving an input conversation of a second language user in the form of speech, receiving an context of conversation and an information of translation history information from the context information management unit and converting the input conversation into text in the second language;
a second morphological analysis module for receiving the second language text, receiving an context of conversation and an information of translation history information from the context information management unit and separating sentences and words from the input text, tagging each separated word with part-of-speech tags;
a second syntactic analysis module for receiving part-of-speech tags and an context of conversation and an information of translation history information from the context information management unit, setting syntactic relationships between the words, and generating a second language syntactic tree indicative of results of the setting;
a second transfer module for receiving the generated second language syntactic tree and an context of conversation and an information of translation history information from the context information management unit, converting the second language syntactic tree into a first language syntactic tree, and translating second language vocabularies corresponding to a terminal node into first language vocabularies, and
a second generation module for receiving the first language vocabularies, receiving an context of conversation and an information of translation history information from the context information management unit and generating first language sentences from the first language vocabularies.

5. The apparatus of claim 4, wherein the second interpretation and translation unit further comprises:
a second translation information output module for outputting the generated first language sentences in the form of text; and
a second speech synthesis module for outputting the generated second language sentences in the form of speech.

6. The apparatus of claim 1, wherein the context information management unit comprises:
a first language-second language context processing module for managing conversational context and translation history information analyzed and processed by the first interpretation and translation unit; and
a second language-first language context processing module for managing conversational context and translation history information analyzed and processed by the second interpretation and translation unit.

7. The apparatus of claim 1, further comprising a two-way communication unit disposed between the first and second interpretation and translation units and the context information management unit and configured to perform mutual communication therebetween so as to collect and provide conversational context and translation history information.

8. The apparatus of claim 7, further comprising a context history management unit for storing tire conversational context and the translation history information received from the two-way communication unit in a context translation information database (DB), searching the context translation information DB for information required to process context by the context information management unit, and transferring found information.

9. A method of providing a two-way automatic interpretation and translation service, comprising:
providing an interpretation service for receiving an input conversation in a first language or a second language in a form of speech and outputting results of interpretation of the input conversation in a form of speech in the second language or the first language, and a translation service for receiving an input conversation in the first language or the second language in a form of text and outputting results of translation of the input conversation in a form of text in the second language or the first language, using a first interpretation and translation unit or a second interpretation and translation unit; and
sharing and managing, by a context information management unit receiving conversational context and translation history information processed when translation is performed from the first and second interpretation and translation units, the conversational context and the translation history information.

10. The method of claim 9, wherein the providing the interpretation and translation service using the first interpretation and translation unit is configured, to receive an input conversation of a first language user in the form of speech, receive an context of conversation and an information of translation history information from a context information management unit and converts the conversation into text in tire first language, separate sentences and words from the input text, and tag each separated word with part-of-speech tags, and sets syntactic relationships between the words, and generates a first language syntactic tree indicative of results of the setting, and converts the first language syntactic free into a second language syntactic tree, and translates first language vocabularies corresponding to a terminal node into second language vocabularies and generates second language sentences from the second language vocabularies.

11. The method of claim 9, wherein the providing the interpretation and translation service using the second interpretation and translation unit is configured to receive an input conversation of a second language user in the form of speech, receive an context of conversation and an information of translation history information from a context information management unit and converts the conversation into text in the first language, separate sentences and words from the input text, and tag each separated word with part-of-speech tags, and sets syntactic relationships between the words, and generates a second language syntactic tree indicative of results of the setting, and converts the second language syntactic tree into a first language syntactic tree, and translates second language vocabularies corresponding to a terminal node into first language vocabularies and generates first language sentences from the first language vocabularies.

12. The method of claim 9, wherein the sharing and managing the conversational context and the translation history information analyzed and processed by the first and second interpretation and translation units is configured to searches the context translation information DB for information required to process context by the first and second interpretation and translation units, and transfers the found information.

* * * * *